United States Patent [19]
Tochihara et al.

[11] Patent Number: 5,485,188
[45] Date of Patent: Jan. 16, 1996

[54] INK JET RECORDING METHOD EMPLOYING INKS, INK SET, AND APPARATUS FOR USE WITH THE INKS

[75] Inventors: Shinichi Tochihara, Hadano; Shinichi Sato, Kawasaki, both of Japan

[73] Assignee: Canon Kabushiki Kaisha, Tokyo, Japan

[21] Appl. No.: 166,819

[22] Filed: Dec. 15, 1993

[30] Foreign Application Priority Data

Dec. 25, 1992 [JP] Japan ................... 4-346709

[51] Int. Cl.⁶ ................................................. C09D 11/02
[52] U.S. Cl. ...................... 347/100; 347/43; 106/20 D
[58] Field of Search .................... 347/100, 96, 43; 106/20 D

[56] References Cited

U.S. PATENT DOCUMENTS

| | | | |
|---|---|---|---|
| 4,682,216 | 7/1987 | Susaki et al. ................... | 358/79 |
| 4,923,515 | 5/1990 | Koike et al. ................... | 106/22 |
| 5,025,271 | 6/1991 | Baker et al. ................... | 347/85 |
| 5,078,790 | 1/1992 | Tochihara et al. ................... | 106/20 |
| 5,080,716 | 1/1992 | Aoki et al. ................... | 106/20 |
| 5,099,255 | 3/1992 | Koike et al. ................... | 346/1.1 |
| 5,101,217 | 3/1992 | Iwata et al. ................... | 346/1.1 |
| 5,125,969 | 6/1992 | Nishiwaki et al. ................... | 106/22 |
| 5,131,949 | 7/1992 | Tochihara et al. ................... | 106/20 |
| 5,132,700 | 7/1992 | Tochihara et al. ................... | 346/1.1 |
| 5,135,571 | 8/1992 | Shirota et al. ................... | 106/22 |
| 5,137,570 | 8/1992 | Nishiwaki et al. ................... | 106/22 |
| 5,139,868 | 8/1992 | Mori et al. ................... | 428/327 |
| 5,148,186 | 9/1992 | Tochihara et al. ................... | 346/1.1 |
| 5,198,023 | 3/1993 | Stoffel ................... | 106/22 R |
| 5,213,613 | 5/1993 | Nagashima et al. ................... | 106/20 R |
| 5,256,194 | 10/1993 | Nishiwaki et al. ................... | 106/22 K |
| 5,258,066 | 11/1993 | Kobayashi et al. ................... | 106/22 R |

FOREIGN PATENT DOCUMENTS

| | | |
|---|---|---|
| 0507239 | 10/0992 | European Pat. Off. . |
| 0061176 | 9/1982 | European Pat. Off. . |
| 55-29546 | 3/1980 | Japan . |
| 64-63185 | 3/1989 | Japan . |

*Primary Examiner*—Benjamin R. Fuller
*Assistant Examiner*—Valerie Ann Lund
*Attorney, Agent, or Firm*—Fitzpatrick, Cella, Harper & Scinto

[57] ABSTRACT

An ink jet color recording method for forming a color image on a recording member by using an ink set that includes at least four color inks: yellow, magenta and cyan inks each containing an anion dyestuff and a nonionic surfactant, and a color ink containing a cation dyestuff and capable of developing a black color when mixed with at least one of the yellow, magenta and cyan inks. The amount of the nonionic surfactant in each of the yellow, magenta and cyan inks is 0.5 to 20% by weight based on the total amount of the ink. An ink jet recording apparatus having head portions corresponding to these inks is used to jet droplets of each ink.

20 Claims, 6 Drawing Sheets

INK JET RECORDING METHOD EMPLOYING INKS, INK SET, AND APPARATUS FOR USE WITH THE INKS

BACKGROUND OF THE INVENTION

1. Field of the Invention

This invention relates to an ink jet color recording method and, more particularly, to an ink jet color recording method achieving good color recording on any recording paper, e.g., non-coated paper or ordinary paper, such as woodfree paper, non-woodfree paper and bond paper. This invention also relates to an ink set and an apparatus for use with the method.

2. Description of the Related Art

In ink jet recording methods, various ink ejection methods, such as an electrostatic attraction method based on applying a high voltage, a method of causing mechanical vibration or a displacement in a colored ink (ink) by using a piezoelectric element, and a method of utilizing a pressure caused by heating and foaming ink, are used to generate a droplet of ink and to cause the same to fly and attach to a recording member, such as paper, to form an ink dot, thus performing recording. Ink jet recording methods therefore realize low-noise, high-speed and multi-color printing.

For example, recording information or images by such ink jet recording methods may be applied as a surface image for observation using paper or an ink jet recording sheet or the like as a recording member, as a recorded image for observation projected on a screen or the like by using a transparent recording member and an optical apparatus such as an overhead projector, preparation of color-decomposed plates for forming positive plates for color printing, use of a recording member as a color mosaic filter with a color display device such as a liquid crystal device, and an apparel or large-form display using a fabric recording member. Thus, this kind of recording can be applied in various ways and, therefore, attracts attention.

On the other hand, ink jet printers have been developed which are capable of suitably printing monochromatic images on ordinary paper generally used, such as woodfree and non-woodfree paper and ordinary plain paper copier (PPC) paper (electrophotographic recording paper), and which have been realized by an increase in the printing dot density of printing heads and improvements in ink properties. Such ink jet printers are now being widely developed and are being designed as smaller and low-cost units.

However, high-quality images cannot be obtained by color ink jet printers presently available unless coated paper specially developed for ink jet recording is used.

In general, a recording method based on subtractive color mixing can be mentioned as a typical color image forming method based on an ink jet recording method. That is, three primary colors, such as cyan, magenta and yellow, are mixed to express various colors. In this method, ink droplets of the three primary colors, cyan, magenta and yellow, are superposed to express black. In this case, droplets of inks of these colors having approximately equal volumes are used and three ink droplets are attached to a recording member while being superposed on each other. There is, therefore, a problem in that a dot thereby formed spreads excessively in comparison with ink portions where colors other than black are recorded to form a thicker line, resulting in an unnatural image. Also, the amount of ink on the black portion is so large that ink absorption failure of the recording member can occur. This problem is important because the frequency of recording in black is usually high when recording is performed.

To avoid this problem, black is conventionally expressed by using a black ink in addition to inks of the three primary colors, cyan, magenta and yellow.

However, even if recording is performed by using inks of four colors, i.e., cyan, magenta, yellow and black, the problems described below still remain.

(1) If a recording member is ordinary paper such as woodfree paper to which two ink droplets of different colors are jetted in a superposing manner to form a mixed color portion, a certain time is required to absorb the increased amount of ink, and the ink droplets permeate through gaps between paper fibers in all directions as well as in a direction along a cross section of the recording member during the absorption, thereby forming non-uniform dots and causing irregular line thickening (feathering). As a result, an unclear image having reduced edge sharpness is formed.

(2) Even in a case where two ink droplets of different colors are jetted to adjacent two places, the inks are partially mixed at the boundary between the two places before they are fixed, thereby causing boundary bleeding between the different colors and forming an unclear image.

(3) Ink in a color-mixture portion where the amount of jetted ink is increased is not fixed well and it is possible that the recording apparatus or the recording member will be contaminated by contact therebetween or the ink will attach to an operator's hand.

The cause of these problems resides in that the ink previously jetted is not sufficiently fixed in the period of time for jetting the next ink to the adjacent place or to the superposed position.

To solve these problems, methods of using a fast set ink having a high permeation speed such that the fixation time is very short, have been provided. For example, a method such as that disclosed in Japanese Patent Laid-Open Publication No. 55-29546 has been proposed in which the amount of a surfactant in ink is increased in comparison with the conventional ink composition, and ink is made to permeate through paper by utilizing the property of the surfactant improving permeation into cellulose fibers of paper so that the ink apparently dries in an instant.

If such an ink is used, a problem described below is encountered although bleeding can be prevented. That is, by an increase in permeation speed, the penetration of dyestuffs into a recording member is promoted so that the color density is reduced, and wetting on the recording member surface is improved. Therefore, feathering, i.e., a small amount of running of ink along paper fibers, can occur easily around an image of each color. Feathering is unnoticeable in a color image region but noticeable in a black image region and particularly reduces the printing quality. In particular, if the black image region is formed as a black character, the character has an unclear image, low in sharpness and poor in printing quality.

Also in color recording printers, black characters are used most frequently, and the printing quality thereof is important. Therefore, it is preferable, in terms of apparent image impression, to form sharper edges without unnatural edge thickening and to simultaneously set a higher color density in comparison with other colors, when black characters are formed.

To solve these problems and to obtain a high-quality image having reduced feathering and a high density, there is a need to use a black ink having a comparatively low permeation speed. However, if such an ink is used, bleeding of color inks occurs at a boundary portion of a recording image region of each color adjacent to a black region, thereby considerably reducing the printing quality.

On the other hand, Japanese Patent Laid-Open Publication No. 64-63185 discloses a method in which a colorless or light color liquid containing a compound for making a dyestuff in ink insoluble is attached to a portion of a recording member to which the ink is to be thereafter attached. The dyestuff is thereby made insoluble to limit bleeding and feathering and to improve the color-developed density, the resolution and other quality factors.

This method, requiring the operation of previously jetting such a liquid to any printing portion, entails the problems of an increase in total printing time, and an increase in fixation time and cockling of paper due to an increase in the total volume of liquid droplets at each printing portion. Also, this method is disadvantageous in terms of printing cost.

SUMMARY OF THE INVENTION

In view of the above-described problems, an object of the present invention is to provide an ink jet color recording method for forming a high-quality color image having a suitable color density, and free from feathering at a color-mixture portion, mixing of inks of different colors at color boundaries, and density unevenness, and for forming an image in which qualities of black characters are particularly improved, and in which inks of black and other colors do not mix with each other at respective color boundaries, and an ink set and an apparatus for use with the method.

To achieve this object, according to one aspect of the present invention, there is provided an ink jet color recording method for forming a color image on a recording member by using at least four color inks, comprising using color inks (1) to (4) shown below and mixing the color ink (4) and at least one of the color inks (1) to (3) on the recording member to form a black image.

(1) A yellow ink containing an anion dyestuff and a nonionic surfactant, the amount of the nonionic surfactant being 0.5 to 20% by weight of the total amount of the ink, (2) A magenta ink containing an anion dyestuff and a nonionic surfactant, the amount of the nonionic surfactant being 0.5 to 20% by weight of the total amount of the ink, (3) A cyan ink containing an anion dyestuff and a nonionic surfactant, the amount of the nonionic surfactant being 0.5 to 20% by weight of the total amount of the ink, and (4) A color ink containing a cation dyestuff and capable of developing a black color when mixed with at least one of the inks (1) to (3).

According to another aspect of the present invention, there are provided an ink set including at least four color inks shown below and an ink jet recording apparatus using the ink set.

(1) A yellow ink containing an anion dyestuff and a nonionic surfactant, the amount of the nonionic surfactant being 0.5 to 20% by weight of the total amount of the ink, (2) A magenta ink containing an anion dyestuff and a nonionic surfactant, the amount of the nonionic surfactant being 0.5 to 20% by weight of the total amount of the ink, (3) A cyan ink containing an anion dyestuff and a nonionic surfactant, the amount of the nonionic surfactant being 0.5 to 20% by weight of the total amount of the ink, and (4) A color ink containing a cation dyestuff and capable of developing a black color when mixed with at least one of the inks (1) to (3).

DESCRIPTION OF THE PREFERRED EMBODIMENTS

Figure 1:
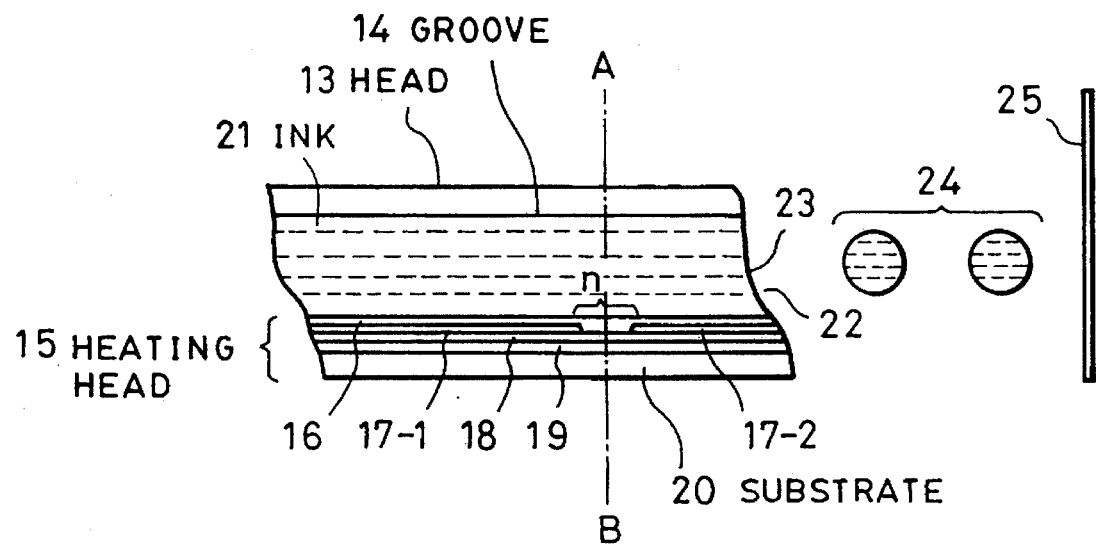
FIG. 1 is a longitudinal sectional view of a head of an ink jet recording apparatus.

The inventors of the present invention have eagerly conducted studies to determine if the color ink (4) and some of the inks (1) to (3) are mixed for recording when recording is performed by using the above-described color inks (1) to (4) and particularly when a black image is thereby formed, a good image can be obtained in which inks of different colors do not mix with each other at each of color boundaries between single-color portions of yellow, magenta and cyan and color-mixture portions, which is free from the above-described problems of a reduction in color density and density unevenness in a solid region due to non-uniform dyeing, and in which a black image portion, in particular, has improved qualities such that mixing at the boundaries on other colors is prevented. The inventors have achieved the invention on the basis of this finding.

The following is thought to be the reason for this effect.

Because the nonionic surfactant contained in the color inks has no selective affinity with a fiber layer in the surface of paper, a uniform dyeing effect can be obtained and occurrence of density unevenness can be prevented. Further, because the extent of spreading of an ink droplet attached to the paper surface is increased, the thickness of ink layers is reduced so that, even if inks of different colors are adjacent to each other, they are fixed before the amounts of inks contacting each other are increased out of the range of a very small amount. Therefore, mixing of the inks of different colors at the color boundary can be limited.

Also, when one of the color inks (1) to (3) and the color ink (4) are mixed to form a black image, that is, when the anion dyestuff of one of the color inks (1) to (3) and the cation dyestuff containing in the color ink (4) are mixed, these dyestuffs react with each other on the recording member to form a complex insoluble in water. Therefore, irregular blurring of dots are limited so that improved black character qualities can be obtained. By a synergistic effect of the above-described effect of the surfactants in the color inks and the solidification caused by the reaction between the dyestuffs, a high-quality color image free from mixing of the inks at the boundaries between a black portion and each of single-color portions and color-mixture portions can be obtained.

The present invention will be described below in more detail.

Each of the inks (1) to (3) of the present invention is characterized by containing an anion dyestuff and a nonionic surfactant. Preferably, the nonionic surfactant contained is polyoxyethylene alkyl ether, polyoxyethylene phenyl ether, polyoxyethylene-polyoxypropylene glycol, polyoxyethylene-polyoxypropylene alkyl ether, or an adduct of acetylene glycol and polyethylene oxide. More preferably, it is polyoxyethylene-polyoxypropylene alkyl ether, or an adduct of acetylene glycol and polyethylene oxide.

The content of the nonionic surfactant in each of the inks (1) to (3) is set to 0.5 to 20 wt %. If it is not greater than 0.5 wt %, spreading of ink droplets attached to a paper surface is limited and the thickness of ink layers is so small that mixing of different color inks occurs at color boundaries. If the content of the nonionic surfactant is greater than 20 wt % ink droplets spread excessively so that dot shapes are irregular, resulting in a considerable deterioration in character quality.

Examples of the anion dyestuff are C.I. Direct Yellow 86, C.I. Acid Yellow 23, C.I. Direct Yellow 142, C.I. Acid Red 18, C.I. Acid Red 27, C.I. Acid Red 52, C.I. Acid Red 289, C.I. Direct Blue 86, C.I. Direct Blue 199, C.I. Acid Blue 9, and the like.

The content of these dyestuffs in ink is not particularly limited but it is, preferably, about 0.1 to 5 wt %.

The ink (4) of the present invention is characterized by containing a cation dyestuff which is capable of developing a black color when mixed with the dyestuff of some of the inks (1) to (3).

Examples of the cation dyestuff are C.I. Basic Yellow 9, 11, 21, 29, 51, 63, C.I. Basic Blue 1, 3, 5, 9, 69, 147, C.I. Basic Red 1, 3, 13, 22, C.I. Basic Red 1, 3, 13, 22, C.I. Basic Green 1, 4, 10, C.I. Basic Violet 7, 10, 23, and the like.

The content of these dyestuffs in ink is not particularly limited but it is, preferably, about 0.1 to 5 wt %.

A suitable medium used to prepare the inks (1) to (4) of the present invention is water or a solvent which is a mixture of water and a water-soluble organic solvent. Preferably, water used as the medium is not ordinary water containing various ions but deionized water.

Examples of the water-soluble organic solvent are amides, such as dimethylformamide and dimethylacetamide, acetone and other ketones, ethers, such as tetrahydrofuran and dioxane, alkyl glycols, such as polyethylene glycol, propylene glycol, butylene glycol, triethylene glycol, 1, 2, 6-hexanetriol, thioglycol, hexylene glycol and diethylene glycol, lower alkyl ethers of polyhydric alcohols, such as ethylene glycol methyl ether, diethylene glycol monomethyl ether, and triethylene glycol monomethyl ether, monohydric alcohols, such as ethanol and isopropyl alcohol, and other kinds of compounds, such as glycerin, N-methyl-2-pyrrolidone, 1, 3-dimethyl-2-imidazolidinone, triethanolamine, sulfolane and dimethylsulfoxide.

One of these solvents may be used alone or a mixture of two or more of these solvents may be used. The content of these solvents in ink is 5 to 40 wt % of the total amount of ink and, more preferably, 10 to 30 wt %.

The inks (1) to (4) of the present invention may contain, as well as the various constituents described above, an anti-clogging agent, such as urea or a derivative of urea, a viscosity controlling agent, such as polyvinyl alcohol, a kind of cellulose or a water-soluble resin, a pH regulator, such as a buffer liquid, a mildewproofing agent, an antioxidant, and other additives, as long as the achievement of the object of the present invention is not precluded thereby.

Needless to say, the color ink jet recording method of the present invention may be practiced with any ink jet recording system, although it is particularly suitable for an ink jet system in which ink is ejected by foaming of ink with thermal energy.

In color ink jet recording in accordance with the present invention, it is preferable that the ejection droplet volume, i.e., the volume of an ink droplet ejected through one nozzle by one ejection pulse, is set to 10 to 70 pl/pulse. If the ejection rate is higher than 70 pl/pulse, the volume of ink may exceed an allowable amount of ink which can be absorbed and fixed in the fiber layer in the paper surface, and which depends upon the quantity of the surfactant contained in each of the color inks (1) to (3) of the invention. Then, the ink permeates into a pore layer below the fiber layer by the permeating effect of the surfactant to reduce the color density and to cause a deterioration in image quality by irregular blurring.

To record a black image by ink jet recording in accordance with the present invention, the ink (4) and some of the inks (1) to (3) capable of developing black when mixed with the ink (4) are placed in the same or adjacent places on the recording member to be mixed with each other.

Figure 2:
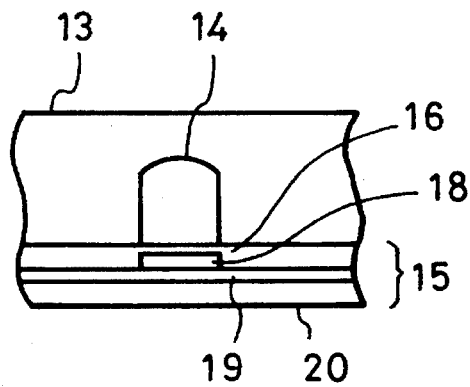
FIG. 2 is a transverse sectional view of the head of the ink jet recording apparatus.
Figure 3:
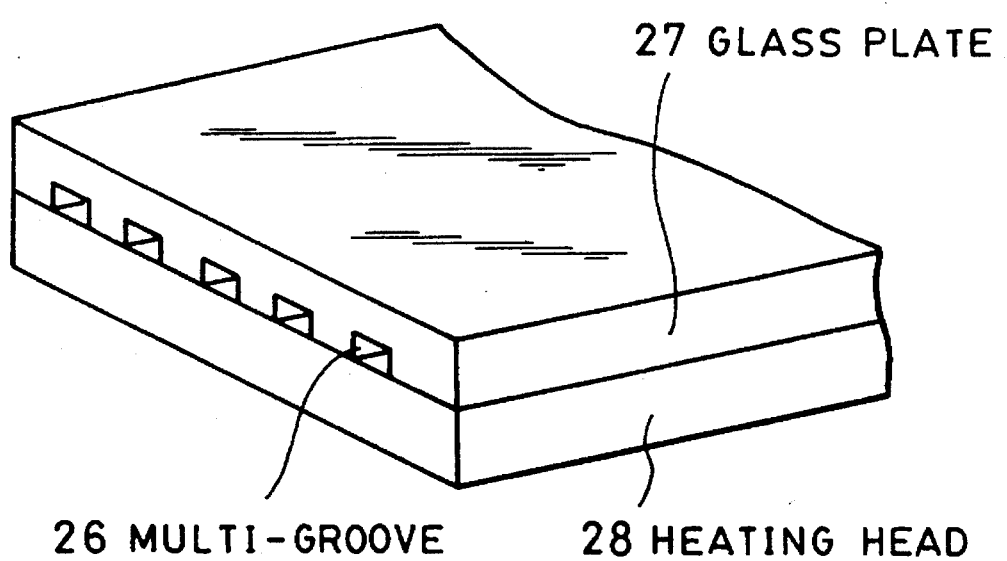
FIG. 3 is an external perspective view of the head of the ink jet recording apparatus.

An example of a recording apparatus suitable for recording in accordance with the present invention follows. For the present invention, it is preferable to use an ink ejection system in which a recording signal is applied to recording ink in a recording head to cause thermal energy therein, and a droplet of recording ink is jetted by thermal energy thereby caused. FIGS. 1 to 3 show the structure of recording heads constituting an essential portion of the recording apparatus. FIG. 1 is a cross section of a head 13 along an ink channel, and FIG. 2 is a cross section along the line A–B of FIG. 1.

The recording head 13 is obtained by bonding a glass, ceramic or plastic member in which an ink channel is formed and a heating head 15 having heating resistors for thermal recording (not limited to the illustrated head). The heating head 15 has a protective film 16 formed of silicon oxide, aluminum electrodes 17-1 and 17-2, a heating resistor layer 18 formed of nichrome or the like, a heat accumulation layer 19, and a substrate 20 formed of alumina or the like and having an improved heat releasing property.

A recording ink 21 fills the channel to an ejection orifice 22 and forms a meniscus 23 by a pressure P.

When an electric signal is applied between the electrodes 17-1 and 17-2, heat is abruptly developed in a region of the heating head 15 indicated at n, a bubble is thereby formed in recording ink 21 which is in contact with this region, and a meniscus of the ink is formed by the pressure of the bubble. A recording ink droplet 24 is formed from the meniscuses through the orifice 22 and flies toward a recording member 25. FIG. 3 schematically shows a recording head in which a multiplicity of nozzles each corresponding to the head 'shown in FIG. 1. This recording head is made by tightly connecting a member 27 formed of a glass plate or the like and having a multiplicity of channels and a heating head 28 similar to that described above with reference to FIG. 1.

Figure 4:
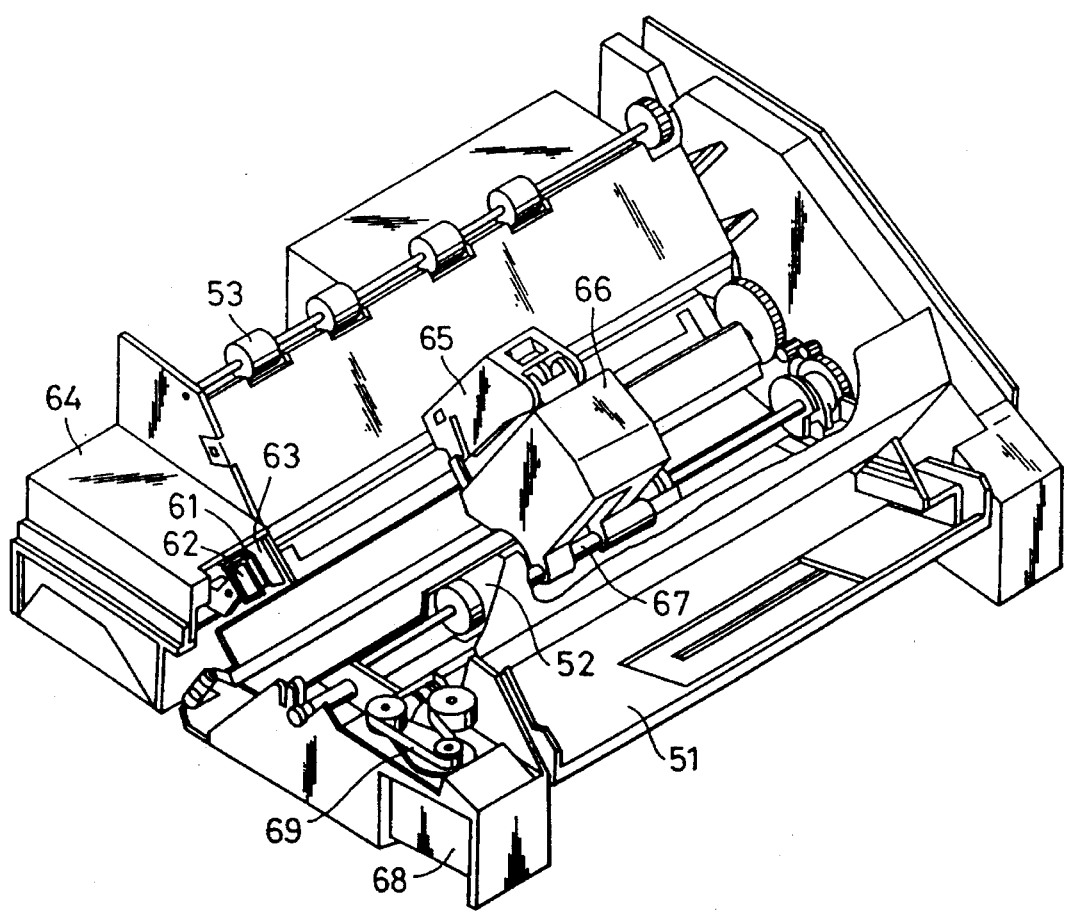
FIG. 4 is a perspective view of an example of the ink jet recording apparatus.

FIG. 4 shows an example of an ink jet recording apparatus in which this head is incorporated.

A member 61 shown in FIG. 4 is a blade provided as a wiping member. The blade 61 has a fixed end retained by a blade retaining member and has the form of a cantilever. The blade 61 is positioned adjacent to a recording area where recording is performed by a recording head 65, and is capable of moving in a direction perpendicular to the direction of movement of the recording head and contacting an outlet surface of the recording head to cap the same. An ink absorbing member 63 is disposed adjacent to the blade 61 and is retained so as to project into a recording head 65 traveling path as in the case of the blade 61. The blade 61, a cap 62 and the absorbing member 63 form an ejection recovery unit 64. Water, dust and the like are removed from the ink outlet surface by the blade 61 and the absorbing member 63.

The recording head 65 has ejection energy generation means and performs recording by ejecting ink to a recording member facing the outlet surface in which outlet openings are arranged. The recording head 65 is mounted on a carriage 66 and is moved by the carriage 66. The carriage 66 is swingably engaged with a guide shaft 67 and has a portion connected to a belt 69 (not shown) driven with a motor 68. The carriage 66 can be moved thereby along the guide shaft 67 over the recording head 66 recording area and adjacent areas.

A sheet feeder unit 51 serves to insert recording members into the apparatus. A roller 52 is a sheet feed roller which is driven with a motor (not shown). By these sheet supply means, a recording member is fed to a position such as to face the outlet surface of the recording head. As recording proceeds, the recording member is transported to a sheet discharge section in which discharge rollers 53 are arranged.

In the thus-constructed apparatus, when the recording head 65 is returned to a home position, for example, after the completion of recording, the cap 62 of the head recovery unit 64 is in a position of receding out of the recording head 65 traveling path but the blade 61 is projecting into the traveling path. Consequently, the outlet surface of the recording head 65 is wiped with the blade 61. When capping is performed by bringing the cap 62 into contact with the outlet surface of the recording head 65, the cap 62 is moved so as to project into the recording head traveling path.

When the recording head 65 is moved from the home position to a recording start position, the cap 62 and the blade 61 are in the same positions as those described above. During this movement, therefore, the outlet surface of the recording head 65 is also wiped.

The recording head is also moved to the home position adjacent to the recording area with a predetermined spacing when the recording head is moved over the recording area to perform recording, as well as at the time of completion of recording or ejection recovery. Wiping is also performed during this movement.

Figure 5:
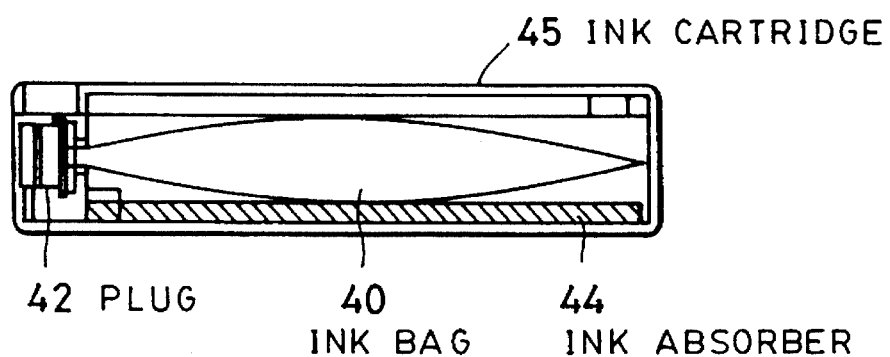
FIG. 5 is a longitudinal sectional view of an ink cartridge.

FIG. 5 shows an ink cartridge 45 containing ink, which is supplied to the head through an ink supply member, e.g., a tube. The ink cartridge 45 has an ink container 40 containing the ink to be supplied, e.g., an ink bag. A rubber plug 42 is provided at an end portion of the ink bag 40. A needle (not shown) is inserted into the plug 42 to enable the ink in the ink bag 40 to be supplied to the head. The ink cartridge 45 also has an absorbing member for receiving waste ink.

Preferably, a liquid contacting surface of the ink container which contacts ink is formed of polyolefin and, in particular, polyethylene.

The ink jet recording apparatus used in accordance with the present invention is not limited to the above-described type in which the head and the ink cartridge are separate from each other. An ink jet recording apparatus having a head and an ink cartridge integrally combined with each other, as shown in FIG. 6, can also be used suitably.

Figure 6:
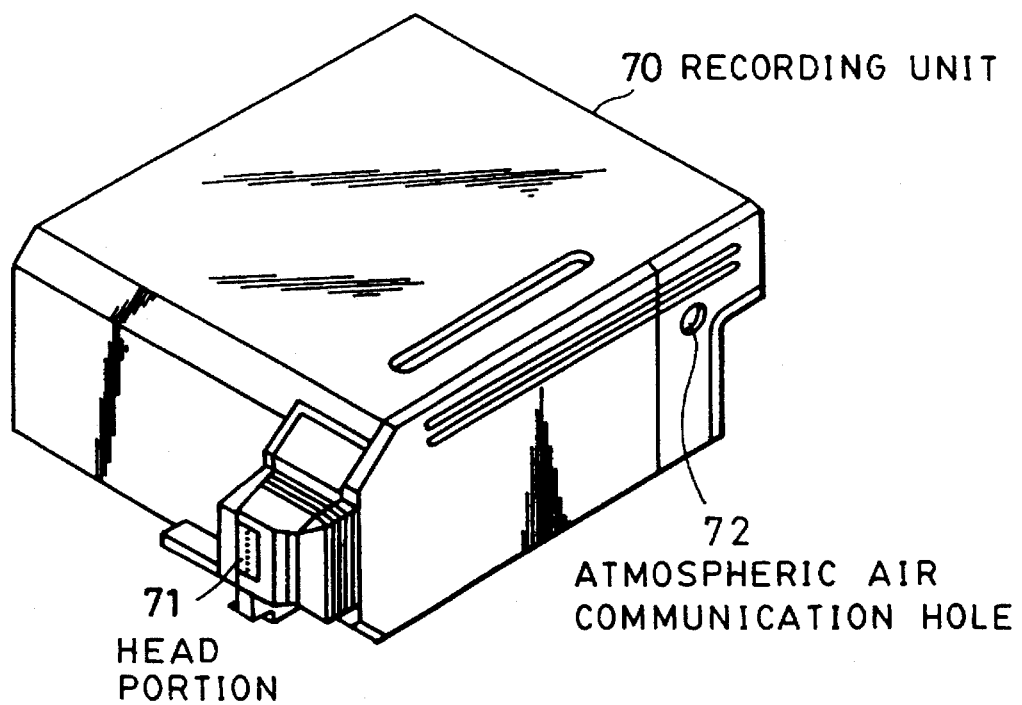
FIG. 6 is a perspective view of a recording unit.

FIG. 6 shows a recording unit 70 in which an ink container containing ink, e.g., an ink absorbing member, is accommodated. Ink in the ink absorbing member is ejected as ink droplets through a head portion 71 having a plurality of orifices. The ink absorbing member may be formed of, for example, polyurethane. An atmospheric air communication hole 72 for communication between the interior of the recording unit and the atmospheric air is formed. The recording unit 70 is used in place of the recording head shown in FIG. 4 as a unit detachable from the carriage 66. The ink jet recording apparatuses for ejecting ink droplets by applying thermal energy to ink have been described as recording apparatuses used in accordance with the present invention by way of example. For the present invention, however, other types of ink jet recording apparatuses, e.g., a piezoelectric type using a piezoelectric element, can also be utilized.

Figure 7:
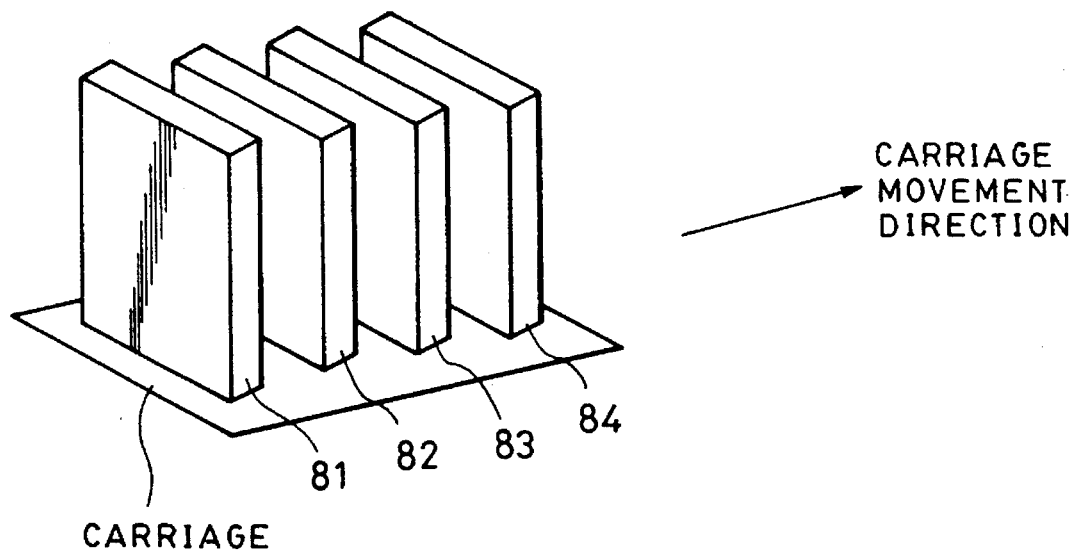
FIG. 7 is a perspective view of an arrangement of a recording section having a plurality of recording heads used in an embodiment of the invention.
Figure 8:
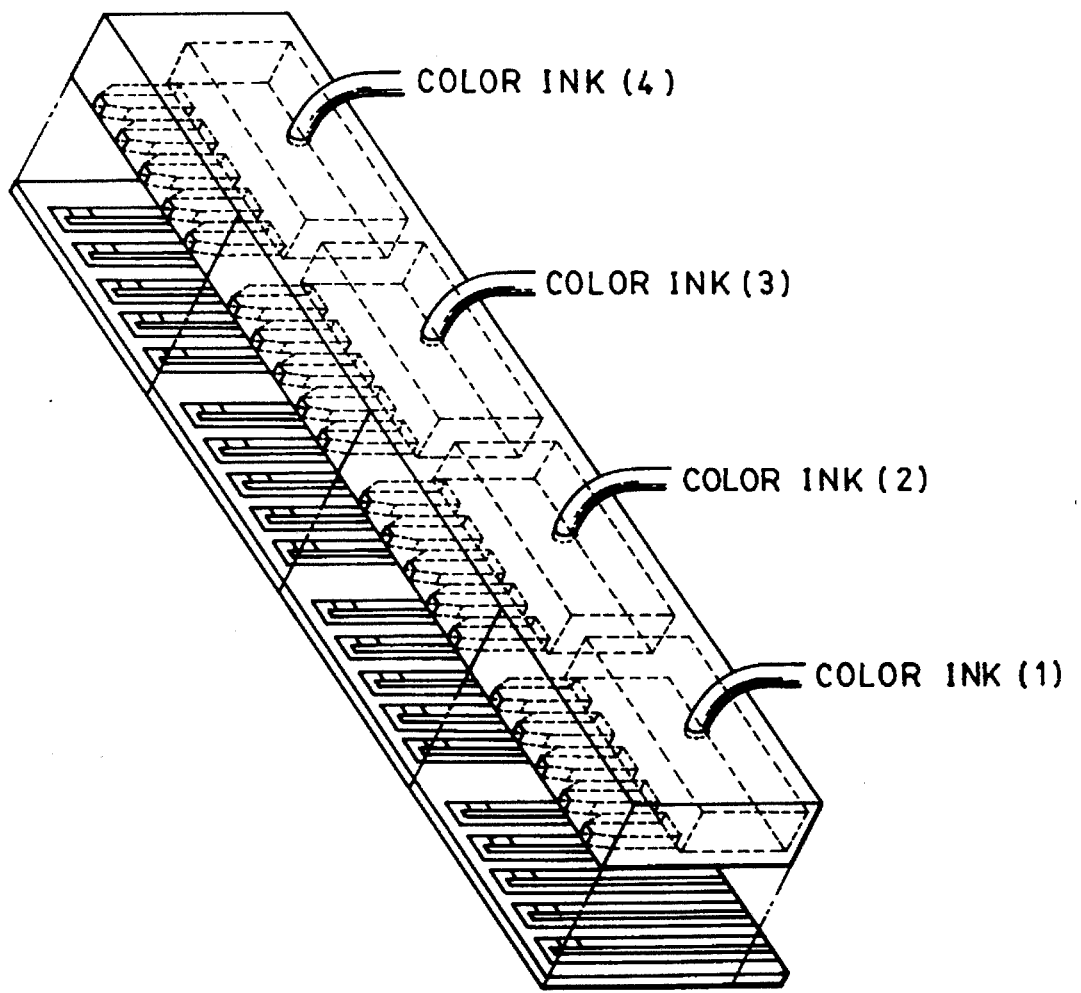
FIG. 8 is a perspective view of another recording head in accordance with the present invention.

For example, a recording apparatus having four recording heads each constructed as shown in FIG. 3 and arranged on a carriage is used to practice the recording method of the present invention. FIG. 7 shows an example of such a recording apparatus. There are recording heads 81, 82, 83, and 84 for ejecting color inks (1) to (4), respectively. The heads are disposed in the recording apparatus to eject inks of respective colors in accordance with a recording signal. The head arrangement is not limited to that shown in FIG. 7, wherein four recording heads are used, and it is also preferable to use one recording head in which ink channels are grouped with respect to inks (1) to (4) as shown in FIG. 8.

EXAMPLES

The present invention will be described in more detail with respect to examples of the invention and comparative examples. In the following, parts and % designate weight-based quantities, unless otherwise noted.

First, constituents shown below were mixed and dissolved, and were pressure-filtered with a membrane filter (Fluoropore Filter, a product from Sumitomo Electric Industries, Ltd.) to obtain color ink sets (A) to (K) of inks (1) to (4).

| Color ink set (A) | |
|---|---|
| (1) Yellow | |
| glycerin | 10 parts |
| diethylene glycol | 5 parts |
| adduct of acetylene glycol and polyethylene oxide | 3 parts |
| C.I. Direct Yellow 86 | 2.5 parts |
| water | 79.5 parts |
| (2) Magenta | |
| glycerin | 10 parts |
| diethylene glycol | 5 parts |
| adduct of acetylene glycol and polyethylene oxide | 3 parts |
| C.I. Acid Red 52 | 2 parts |
| water | 80 parts |
| (3) Cyan | |
| glycerin | 10 parts |
| diethylene glycol | 5 parts |
| adduct of acetylene glycol and polyethylene oxide | 3 parts |
| C.I. Direct Blue 199 | 2.5 parts |
| water | 79.5 parts |
| (4) | |
| glycerin | 10 parts |
| diethylene glycol | 5 parts |
| C.I. Basic Blue 69 | 2 parts |
| water | 83 parts |
| Color ink set (B) | |
| (1) Yellow | |

-continued

| | |
|---|---|
| glycerin | 10 parts |
| diethylene glycol | 5 parts |
| polyoxyethylene-polyoxypropylene alkyl ether | 5 parts |
| C.I. Direct Yellow 86 | 2 parts |
| water | 78 parts |

(2) Magenta

| | |
|---|---|
| glycerin | 10 parts |
| diethylene glycol | 5 parts |
| polyoxyethylene-polyoxypropylene alkyl ether | 5 parts |
| C.I. Acid Red 52 | 2.5 parts |
| water | 77.5 parts |

(3) Cyan

| | |
|---|---|
| glycerin | 10 parts |
| diethylene glycol | 5 parts |
| polyoxyethylene-polyoxypropylene alkyl ether | 5 parts |
| C.I. Direct Blue 199 | 2 parts |
| water | 78 parts |

(4)

| | |
|---|---|
| glycerin | 10 parts |
| diethylene glycol | 5 parts |
| C.I. Basic Red 13 | 0.5 part |
| C.I. Basic Blue 5 | 2 parts |
| water | 82.5 parts |

Color ink set (C)

(1) Yellow

| | |
|---|---|
| glycerin | 10 parts |
| diethylene glycol | 10 parts |
| polyoxyethylene phenyl ether | 7 parts |
| C.I. Direct Yellow 86 | 2.5 parts |
| water | 70.5 parts |

(2) Magenta

| | |
|---|---|
| glycerin | 10 parts |
| diethylene glycol | 10 parts |
| polyoxyethylene phenyl ether | 7 parts |
| C.I. Acid Red 52 | 2 parts |
| water | 71 parts |

(3) Cyan

| | |
|---|---|
| glycerin | 10 parts |
| diethylene glycol | 10 parts |
| polyoxyethylene phenyl ether | 7 parts |
| C.I. Direct Blue 199 | 2.5 parts |
| water | 70.5 parts |

(4)

| | |
|---|---|
| glycerin | 10 parts |
| diethylene glycol | 10 parts |
| C.I. Basic Green 4 | 3 parts |
| water | 77 parts |

Color ink set (D)

(1) Yellow

| | |
|---|---|
| glycerin | 10 parts |
| diethylene glycol | 5 parts |
| adduct of acetylene glycol and polyethylene oxide | 1 part |
| C.I. Direct Yellow 86 | 2.5 parts |
| water | 81.5 parts |

(2) Magenta

| | |
|---|---|
| glycerin | 10 parts |
| diethylene glycol | 5 parts |
| adduct of acetylene glycol and polyethylene oxide | 1 part |
| C.I. Acid Red 52 | 2.5 parts |
| water | 81.5 parts |

(3) Cyan

| | |
|---|---|
| glycerin | 10 parts |
| diethylene glycol | 5 parts |
| adduct of acetylene glycol and polyethylene oxide | 1 part |
| C.I. Direct Blue 199 | 2.5 parts |
| water | 81.5 parts |

(4)

-continued

| | |
|---|---|
| glycerin | 10 parts |
| diethylene glycol | 5 parts |
| C.I. Basic Yellow 21 | 1 part |
| C.I. Basic Blue 5 | 1.5 part |
| water | 82.5 parts |

Color ink set (E)

(1) Yellow

| | |
|---|---|
| glycerin | 5 parts |
| diethylene glycol | 10 parts |
| polyoxyethylene-polyoxypropylene alkyl ether | 15 parts |
| C.I. Direct Yellow 86 | 2.5 parts |
| water | 67.5 parts |

(2) Magenta

| | |
|---|---|
| glycerin | 5 parts |
| diethylene glycol | 10 parts |
| polyoxyethylene-polyoxypropylene alkyl ether | 15 parts |
| C.I. Acid Red 52 | 2 parts |
| water | 68 parts |

(3) Cyan

| | |
|---|---|
| glycerin | 5 parts |
| diethylene glycol | 10 parts |
| polyoxyethylene-polyoxypropylene alkyl ether | 15 parts |
| C.I. Direct Blue 199 | 2.5 parts |
| water | 67.5 parts |

(4)

| | |
|---|---|
| glycerin | 5 parts |
| diethylene glycol | 10 parts |
| C.I. Basic Red 22 | 2.5 parts |
| water | 82.5 parts |

Color ink set (F)

(1) Yellow

| | |
|---|---|
| glycerin | 10 parts |
| diethylene glycol | 5 parts |
| polyoxyethylene phenyl ether | 10 parts |
| C.I. Direct Yellow 86 | 2.5 parts |
| water | 72.5 parts |

(2) Magenta

| | |
|---|---|
| glycerin | 10 parts |
| diethylene glycol | 5 parts |
| polyoxyethylene phenyl ether | 10 parts |
| C.I. Acid Red 52 | 2.5 parts |
| water | 72.5 parts |

(3) Cyan

| | |
|---|---|
| glycerin | 10 parts |
| diethylene glycol | 5 parts |
| polyoxyethylene phenyl ether | 10 parts |
| C.I. Direct Blue 199 | 2 parts |
| water | 73 parts |

(4)

| | |
|---|---|
| glycerin | 10 parts |
| diethylene glycol | 5 parts |
| C.I. Basic Yellow 21 | 1 part |
| C.I. Basic Red 13 | 2 parts |
| water | 82 parts |

Color ink set (G)

(1) Yellow

| | |
|---|---|
| glycerin | 10 parts |
| diethylene glycol | 5 parts |
| adduct of acetylene glycol and polyethylene oxide | 0.1 part |
| C.I. Direct Yellow 86 | 2.5 parts |
| water | 82.4 parts |

(2) Magenta

| | |
|---|---|
| glycerin | 10 parts |
| diethylene glycol | 5 parts |
| adduct of acetylene glycol and polyethylene oxide | 0.1 part |

-continued

| | |
|---|---|
| C.I. Acid Red 52 | 2 parts |
| water | 82.9 parts |

(3) Cyan

| | |
|---|---|
| glycerin | 10 parts |
| diethylene glycol | 5 parts |
| adduct of acetylene glycol and polyethylene oxide | 0.1 part |
| C.I. Direct Blue 199 | 2.5 parts |
| water | 82.4 parts |

(4)

| | |
|---|---|
| glycerin | 10 parts |
| diethylene glycol | 5 parts |
| C.I. Basic Blue 69 | 2 parts |
| water | 83 parts |

Color ink set (H)

(1) Yellow

| | |
|---|---|
| glycerin | 10 parts |
| diethylene glycol | 5 parts |
| sodium dodecylbenzenesulfonate (anion surfactant) | 3 parts |
| C.I. Direct Yellow 86 | 2.5 parts |
| water | 79.5 parts |

(2) Magenta

| | |
|---|---|
| glycerin | 10 parts |
| diethylene glycol | 5 parts |
| sodium dodecylbenzenesulfonate | 3 parts |
| C.I. Acid Red 52 | 2 parts |
| water | 80 parts |

(3) Cyan

| | |
|---|---|
| glycerin | 10 parts |
| diethylene glycol | 5 parts |
| sodium dodecylbenzenesulfonate | 3 parts |
| C.I. Direct Blue 199 | 2.5 parts |
| water | 79.5 parts |

(4)

| | |
|---|---|
| glycerin | 10 parts |
| diethylene glycol | 5 parts |
| C.I. Basic Blue 69 | 2 parts |
| water | 83 parts |

Color ink set (I)

(1) Yellow

| | |
|---|---|
| glycerin | 10 parts |
| diethylene glycol | 5 parts |
| adduct of acetylene glycol and polyethylene oxide | 3 parts |
| C.I. Direct Yellow 86 | 2.5 parts |
| water | 79.5 parts |

(2) Magenta

| | |
|---|---|
| glycerin | 10 parts |
| diethylene glycol | 5 parts |
| adduct of acetylene glycol and polyethylene oxide | 3 parts |
| C.I. Acid Red 52 | 2 parts |
| water | 80 parts |

(3) Cyan

| | |
|---|---|
| glycerin | 10 parts |
| diethylene glycol | 5 parts |
| adduct of acetylene glycol and polyethylene oxide | 3 parts |
| C.I. Direct Blue 199 | 2.5 parts |
| water | 79.5 parts |

(4)

| | |
|---|---|
| glycerin | 10 parts |
| diethylene glycol | 5 parts |
| C.I. Basic Blue 199 | 1.6 part |
| C.I. Acid Red 52 | 0.4 part |
| water | 83 parts |

Color ink set (J)

(1) Yellow

| | |
|---|---|
| glycerin | 10 parts |
| diethylene glycol | 5 parts |
| adduct of acetylene glycol and polyethylene oxide | 25 parts |
| C.I. Direct Yellow 86 | 2.5 parts |
| water | 57.5 parts |

(2) Magenta

| | |
|---|---|
| glycerin | 10 parts |
| diethylene glycol | 5 parts |
| adduct of acetylene glycol and polyethylene oxide | 25 parts |
| C.I. Acid Red 52 | 2 parts |
| water | 58 parts |

(3) Cyan

| | |
|---|---|
| glycerin | 10 parts |
| diethylene glycol | 5 parts |
| adduct of acetylene glycol and polyethylene oxide | 25 parts |
| C.I. Direct Blue 199 | 2.5 parts |
| water | 57.5 parts |

(4)

| | |
|---|---|
| glycerin | 10 parts |
| diethylene glycol | 5 parts |
| C.I. Basic Blue 69 | 2 part |
| water | 83 parts |

Color ink set (K)

| | |
|---|---|
| (1) Yellow | same as that in color ink set (J) |
| (2) Magenta | same as that in color ink set (J) |
| (3) Cyan | same as that in color ink set (J) |
| (4) Black | |

| | |
|---|---|
| glycerin | 10 parts |
| ethylene glycol | 5 parts |
| adduct of acetylene glycol and polyethylene oxide | 2 parts |
| C.I. Basic Yellow 9 | 1 part |
| C.I. Basic Blue 9 | 1 part |
| C.I. Basic Red 13 | 1 part |
| water | 80 parts |

Color ink set (L)

| | |
|---|---|
| (1) Yellow | same as that in color ink set (J) |
| (2) Magenta | same as that in color ink set (J) |
| (3) Cyan | same as that in color ink set (J) |
| (4) Black | |

| | |
|---|---|
| glycerin | 10 parts |
| ethylene glycol | 5 parts |
| C.I. Basic Yellow 9 | 1 part |
| C.I. Basic Blue 9 | 1 part |
| C.I. Basic Red 13 | 1 part |
| water | 82 parts |

Color ink set (M)

| | |
|---|---|
| (1) Yellow | same as that in color ink set (J) |
| (2) Magenta | same as that in color ink set (J) |
| (3) Cyan | same as that in color ink set (J) |
| (4) Black | |

| | |
|---|---|
| glycerin | 10 parts |
| ethylene glycol | 5 parts |
| adduct of acetylene glycol and polyethylene oxide | 2 parts |
| C.I. Food Black 2 | 3 parts |
| water | 80 parts |

Color ink set (N)

| | |
|---|---|
| (1) Yellow | same as that in color ink set (J) |
| (2) Magenta | same as that in color ink set (J) |
| (3) Cyan | same as that in color ink set (J) |
| (4) Black | |

| | |
|---|---|
| glycerin | 10 parts |
| ethylene glycol | 5 parts |
| C.I. Food Black 2 | 3 parts |
| water | 82 parts |

An ink jet color recording apparatus having four multi-nozzle on-demand type heads (corresponding to color inks (1) to (4) in which thermal energy is applied to ink to generate an ink droplet) was used as an ink jet recording apparatus in accordance with the present invention. The ejection rate, i.e., the amount of ink jetted through one nozzle by one electric signal pulse, was determined as jetted-amount/pulse by measuring the total amount of jetted ink (volume) when a signal having $2.7 \times 10^6$ pulses is applied and by dividing this total amount by $2.7 \times 10^6$.

Recording was performed by using the above-mentioned recording apparatus and the color ink sets (A) to (K) at the ejection rates shown in Table 1 and under recording conditions that, when a color printing signal is given, a color image is formed on a recording member with color inks (1) to (3) and mixtures of these inks, and that, when a black printing signal is given, a black image is formed on the recording member by mixing color ink (4) and one of color inks (1) to (4) in the examples of the invention and reference examples 1 to 4, and by using only color ink (4) in comparative examples 5 to 8. Table 1 shows the color ink sets used in the examples of the invention and the comparative examples and black forming methods, and Table 2 shows the result of the evaluation of this recording.

TABLE 1

|  | Color ink sets used | Color inks used for preparing black color | Ejection droplet volume (pl/pulse) |
|---|---|---|---|
| Example 1 | (A) | (1) + (4) | 10 |
| Example 2 | (A) | (1) + (4) | 30 |
| Example 3 | (A) | (1) + (4) | 50 |
| Example 4 | (B) | (1) + (4) | 30 |
| Example 5 | (C) | (2) + (4) | 40 |
| Example 6 | (D) | (2) + (4) | 40 |
| Example 7 | (E) | (3) + (4) | 50 |
| Example 8 | (F) | (3) + (4) | 50 |
| Comparative Example 1 | (G) | (1) + (4) | 30 |
| Comparative Example 2 | (H) | (1) + (4) | 30 |
| Comparative Example 3 | (I) | (1) + (4) | 30 |
| Comparative Example 4 | (J) | (1) + (4) | 30 |
| Comparative Example 5 | (K) | (4) | 30 |
| Comparative Example 6 | (L) | (4) | 30 |
| Comparative Example 7 | (M) | (4) | 30 |
| Comparative Example 8 | (N) | (4) | 30 |

(Evaluation method and evaluation criteria)

(1) Bleeding

Color samples in which different colors adjacent to each other were printed to observe the state of bleeding, and the state of bleeding was evaluated using the following criteria with respect to seven colors, i.e., yellow, cyan, magenta, and black, red, green and blue made by superposing and mixing two of yellow, cyan, and magenta inks and color ink (4).

○: No bleeding is recognized at all boundaries.

Δ: Bleeding is noticeable at boundaries with red, green and blue where the amount of attached ink is large.

X: Bleeding is considerable at almost all boundaries.

(2) Color uniformity (density unevenness)

The uniformity of solid color portions was determined by observation with eye.

○: Solidness is very uniform and there is substantially no color unevenness.

Δ: Color unevenness is noticeable in a place where the density of paper fibers is high.

X: Color unevenness is very noticeable.

(3) Blurring occurrence rate (feathering)

300 dots were continuously printed on copying paper and bond paper on the market so that the dots were prevented from contacting each other. Prints were air-dried for 24 hours at room temperature, and the number of dots where non-uniform or irregular blurring occurred was counted with a microscope. The result of printing was evaluated with respect to the following percents of the number of dots.

⊙: 10% or less

○: 11 to 30%

Δ: 31 to 50%

X: 51% or less

The following papers were used for this test and the result was evaluated in an integrated evaluation manner.

a) Canon Paper NP-DRY (PPC paper, a product from Canon Inc.), b) Xerox 4024 (PPC paper, a product from Xerox Corp.), and c) Gilbert Bond (bond paper, a product from The Mead Corp.).

TABLE 2

|  | (1) | (2) Black portion/ color portion |  | (3) Black dots/ color dots |  |
|---|---|---|---|---|---|
| Example 1 | ○ | ○ | ○ | ⊙ | ○ |
| Example 2 | ○ | ○ | ○ | ⊙ | ○ |
| Example 3 | ○ | ○ | ○ | ⊙ | ○ |
| Example 4 | ○ | ○ | ○ | ⊙ | ○ |
| Example 5 | ○ | ○ | ○ | ⊙ | ○ |
| Example 6 | ○ | ○ | ○ | ⊙ | ○ |
| Example 7 | ○ | ○ | ○ | ⊙ | ○ |
| Example 8 | ○ | ○ | ○ | ⊙ | ○ |
| Comparative Example 1 | x | ○ | x | Δ | x |
| Comparative Example 2 | x | ○ | x | Δ | x |
| Comparative Example 3 | ○ | ○ | ○ | x | ○ |
| Comparative Example 4 | ○ | ○ | ○ | Δ | x |
| Comparative Example 5 | ○ | ○ | ○ | ○ | ○ |
| Comparative Example 6 | x | ○ | ○ | ⊙ | ○ |
| Comparative Example 7 | ○ | ○ | ○ | ○ | ○ |
| Comparative Example 8 | x | ○ | ○ | ⊙ | ○ |

As described above, a high-quality color image free from mixing of inks of different colors at color boundaries, having a suitable color density and having substantially no density unevenness can be formed even on ordinary paper by using the recording method of the present invention. It is also possible to obtain a color image having black characters in which the qualities of black characters are particularly improved, and in which inks of black and other colors do not mix with each other at color boundaries.

While the present invention has been described with respect to what presently are considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink jet color recording method for forming a color image on a recording member by using at least four colors of ink, comprising the steps of:

selecting the following color inks (1) to (4):

(1) a yellow ink containing an anion dyestuff and a nonionic surfactant, the nonionic surfactant being 0.5 to 20% by weight of the ink, (2) a magenta ink containing an anion dyestuff and a nonionic surfactant, the nonionic surfactant being 0.5 to 20% by weight of the ink, (3) a cyan ink containing an anion dyestuff and a nonionic surfactant, the nonionic surfactant being 0.5 to 20% by weight of the ink, and (4) a color ink containing a cation dyestuff and capable of developing a black color when mixed with at least one of inks (1) to (3); and performing recording by mixing the color ink (4) and at least one of inks (1), (2), and (3) on the recording member to form a black image.

2. An ink jet recording method according to claim 1, wherein the step of performing recording further includes ejecting an amount of each color ink (1) to (4) through one nozzle of an ink jet recording apparatus by one electric signal pulse at a rate of 10 to 70 pl/pulse.

3. An ink jet color recording method according to claim 1, wherein the nonionic surfactant in each ink comprises at least one compound selected from the group consisting of polyoxyethylene alkyl ether, polyoxyethylene phenyl ether, polyoxyethylene-polyoxypropylene glycol, polyoxyethylene-polyoxypropylene alkyl ether, and an adduct of acetylene glycol and polyethylene oxide.

4. An ink jet color recording method according to claim 1, wherein the step of performing recording further includes jetting the inks as an ink droplet onto the recording member by applying thermal energy to the inks.

5. An ink jet recording method according to claim 1, wherein said selecting step includes selecting inks (1), (2) and (3) each containing the respective anion dyestuff in an amount of about 0.1 to 5% by weight of each of said inks (1), (2) and (3), and selecting said ink (4) containing the cation dyestuff in an amount of about 0.1 to 5% by weight of said ink (4).

6. An ink jet color recording method according to claim 1, wherein said selecting step includes selecting inks (1) through (4) having a liquid medium that contains a mixture of water and a water-soluble organic solvent, said mixture being provided in an amount of about 5 to 40% by weight of each of said inks (1) through (4).

7. An ink set comprising at least four color inks:

(1) a yellow ink containing an anion dyestuff and a nonionic surfactant, the nonionic surfactant being 0.5 to 20% by weight of the ink, (2) a magenta ink containing an anion dyestuff and a nonionic surfactant, the nonionic surfactant being 0.5 to 20% by weight of the ink, (3) a cyan ink containing an anion dyestuff and a nonionic surfactant, the nonionic surfactant being 0.5 to 20% by weight of the ink, and (4) a color ink containing a cation dyestuff and which develops a black color when mixed with at least one of the inks (1) to (3).

8. An ink set according to claim 7, wherein the nonionic surfactant in each ink comprises at least one compound selected from the group consisting of polyoxyethylene alkyl ether, polyoxyethylene phenyl ether, polyoxyethylene-polyoxypropylene glycol, polyoxyethylene-polyoxypropylene alkyl ether, and an adduct of acetylene glycol and polyethylene oxide.

9. An ink set according to claim 7, wherein said inks (1), (2) and (3) each contain the respective anion dyestuff in an amount of about 0.1 to 5% by weight of each of said inks (1), (2) and (3), and said ink (4) contains the cation dyestuff in an amount of about 0.1 to 5% by weight of said ink (4).

10. An ink set according to claim 7, wherein said inks (1) through (4) have a liquid medium that contains a mixture of water and a water-soluble organic solvent, said mixture being provided in an amount of about 5 to 40% by weight of each of said inks (1) through (4).

11. An ink jet recording unit comprising:

an ink container that contains an ink set with inks for ink jet recording, wherein said ink set comprises:

(1) a yellow ink containing an anion dyestuff and a nonionic surfactant, the nonionic surfactant being 0.5 to 20% by weight of the ink, (2) a magenta ink containing an anion dyestuff and a nonionic surfactant, the nonionic surfactant being 0.5 to 20% by weight of the ink, (3) a cyan ink containing an anion dyestuff and a nonionic surfactant, the nonionic surfactant being 0.5 to 20% by weight of the ink, (4) a color ink containing a cation dyestuff and which develops a black color when mixed with at least one of the inks (1) to (3), and a head for jetting each of the inks as a droplet.

12. An ink jet recording unit according to claim 11, wherein said head jets said droplet by applying thermal energy to each of the inks.

13. An ink jet recording unit according to claim 11, wherein said inks (1), (2) and (3) each contain the respective anion dyestuff in an amount of about 0.1 to 5% by weight of each of said inks (1), (2) and (3), and said ink (4) contains the cation dyestuff in an amount of about 0.1 to 5% by weight of said ink (4).

14. An ink jet recording unit according to claim 11, wherein said inks (1) through (4) have a liquid medium that contains a mixture of water and a water-soluble organic solvent, said mixture being provided in an amount of about 5 to 40% by weight of each of said inks (1) through (4).

15. An ink jet recording apparatus comprising an ink jet recording unit having:

an ink container that contains an ink set with inks for ink jet recording, wherein said ink set comprises:

(1) a yellow ink containing an anion dyestuff and a nonionic surfactant, the nonionic surfactant being 0.5 to 20% by weight of the ink, (2) a magenta ink containing an anion dyestuff and a nonionic surfactant, the nonionic surfactant being 0.5 to 20% by weight of the ink, (3) a cyan ink containing an anion dyestuff and a nonionic surfactant, the nonionic surfactant being 0.5 to 20% by weight of the ink, (4) a color ink containing a cation dyestuff and which develops a black color when mixed with at least one of the inks (1) to (3), and a head for jetting each of the inks as a droplet.

16. An ink jet recording apparatus comprising a plurality of recording units each having a head that contains an ink of an ink set for ink jet recording wherein said ink set comprises:

(1) a yellow ink containing an anion dyestuff and a nonionic surfactant, the nonionic surfactant being 0.5 to 20% by weight of the ink, (2) a magenta ink containing an anion dyestuff and a nonionic surfactant, the nonionic surfactant being 0.5 to 20% by weight of the ink, (3) a cyan ink containing an anion dyestuff and a nonionic surfactant, the nonionic surfactant being 0.5 to 20% by weight of the ink, (4) a color ink containing a cation dyestuff and which develops a black color when mixed with at least one of the inks (1) to (3), and a head for jetting each of the inks as a droplet.

17. An ink jet recording apparatus comprising:

a plurality of ink cartridges each containing one ink of an ink set for ink jet recording, wherein said ink set comprises:

(1) a yellow ink containing an anion dyestuff and a nonionic surfactant, the nonionic surfactant being 0.5 to 20% by weight of the ink, (2) a magenta ink containing an anion dyestuff and a nonionic surfactant, the nonionic surfactant being 0.5 to 20% by weight of the ink, (3) a cyan ink containing an anion dyestuff and a nonionic surfactant, the nonionic surfactant being 0.5 to 20% by weight of the ink, (4) a color ink containing a cation dyestuff and which develops a black color when mixed with at least one of the inks (1) to (3), and a head for jetting each of the inks as a droplet.

18. An ink jet recording apparatus as in any of claim 15 through 17, in which said head has a heating portion for applying thermal energy to each of the inks.

19. An ink jet recording apparatus as in any of claims 15 through 17, in which said inks (1), (2) and (3) each contain the respective anion dyestuff in an amount of about 0.1 to 5% by weight of each of said inks (1), (2) and (3), and said ink (4) contains the cation dyestuff in an amount of about 0.1 to 5% by weight of said ink (4).

20. An ink jet recording apparatus as in any of claims 15 through 17, wherein said inks (1) through (4) have a liquid medium that contains a mixture of water and a water-soluble organic solvent, said mixture being provided in an amount of about 5 to 40% by weight of each of said inks (1) through (4).

* * * * *

UNITED STATES PATENT AND TRADEMARK OFFICE
CERTIFICATE OF CORRECTION

PATENT NO. : 5,485,188
DATED : January 16, 1996
INVENTOR(S) : SHINICHI TOCHIHARA, ET AL.

It is certified that error appears in the above-indentified patent and that said Letters Patent is hereby corrected as shown below:

<u>COLUMN 4</u>

Line 56, "are" should read --is--.

<u>COLUMN 18</u>

Line 8, "claim 15" should read --claims 15--.

Signed and Sealed this

Twenty-eighth Day of May, 1996

Attest:

BRUCE LEHMAN

*Attesting Officer*     *Commissioner of Patents and Trademarks*